United States Patent
Bruck et al.

(10) Patent No.: US 9,289,854 B2
(45) Date of Patent: Mar. 22, 2016

(54) AUTOMATED SUPERALLOY LASER CLADDING WITH 3D IMAGING WELD PATH CONTROL

(71) Applicants: Gerald J. Bruck, Oviedo, FL (US); Ahmed Kamel, Orlando, FL (US)

(72) Inventors: Gerald J. Bruck, Oviedo, FL (US); Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 399 days.

(21) Appl. No.: 13/936,482

(22) Filed: Jul. 8, 2013

(65) Prior Publication Data
US 2014/0069893 A1 Mar. 13, 2014

Related U.S. Application Data

(63) Continuation-in-part of application No. 13/611,034, filed on Sep. 12, 2012, and a continuation-in-part of application No. 13/611,144, filed on Sep. 12, 2012.

(51) Int. Cl.
B23K 26/34 (2014.01)
B23K 26/342 (2014.01)
B23P 6/00 (2006.01)
(Continued)

(52) U.S. Cl.
CPC ............. B23K 26/342 (2015.10); B23K 26/082 (2015.10); B23K 26/34 (2013.01); B23K 26/345 (2013.01); B23K 35/0244 (2013.01); B23P 6/007 (2013.01); F01D 5/28 (2013.01); F01D 5/286 (2013.01); F01D 5/288 (2013.01); B23K 2201/001 (2013.01)

(58) Field of Classification Search
CPC ......... B23K 26/34; B23K 26/30; B23K 26/08
USPC .............. 219/121.61–121.64, 121.83, 76.14; 29/889.7, 889.71, 281.1, 281.4; 700/28, 118, 119, 166; 228/119, 8, 33; 416/241 R; 415/200
See application file for complete search history.

(56) References Cited

U.S. PATENT DOCUMENTS

| 4,625,095 A | 11/1986 | Das |
| 5,264,678 A | 11/1993 | Powell et al. |
| 5,504,303 A | 4/1996 | Nagy |

(Continued)

FOREIGN PATENT DOCUMENTS

| CN | 148856 | 3/2004 |
| CN | 101694582 A | 4/2010 |

(Continued)

*Primary Examiner* — Samuel M Heinrich

(57) ABSTRACT

Superalloy components, such as service-degraded turbine blades and vanes, are clad by laser beam welding. The welding/cladding path, including cladding application profile, is determined by prior, preferably real time, non-contact 3D dimensional scanning of the component and comparison of the acquired dimensional scan data with specification dimensional data for the component. A welding path for cladding the scanned component to conform its dimensions to the specification dimensional data is determined. The laser welding apparatus, preferably in cooperation with a cladding filler material distribution apparatus, executes the welding path to apply the desired cladding profile. In some embodiments a post-weld non-contact 3D dimensional scan of the welded component is performed and the post-weld scan dimensional data are compared with the specification dimensional data. Preferably the welding path and/or cladding profile application are modified in a feedback loop with the pre- and/or post-welding 3D dimensional scanning.

20 Claims, 8 Drawing Sheets

(51) Int. Cl.
  *B23K 35/02* (2006.01)
  *F01D 5/28* (2006.01)

(56) References Cited

U.S. PATENT DOCUMENTS

| | | | |
|---|---|---|---|
| 5,552,575 | A | 9/1996 | Doumanidis |
| 5,660,669 | A | 8/1997 | Mittleider |
| 5,993,554 | A | 11/1999 | Keicher et al. |
| 6,188,041 | B1 | 2/2001 | Kim et al. |
| 6,694,207 | B2 | 2/2004 | Darrah et al. |
| 7,278,315 | B1 * | 10/2007 | Klein .............. G01N 21/1702 73/598 |
| 8,124,912 | B2 * | 2/2012 | Bayer .................. C21D 1/34 219/121.62 |
| 8,387,853 | B2 | 3/2013 | Tuppen et al. |
| 8,497,450 | B2 | 7/2013 | Bruland et al. |
| 2003/0217993 | A1 | 11/2003 | Stol et al. |
| 2004/0133298 | A1 | 7/2004 | Toyserkani et al. |
| 2004/0173585 | A1 | 9/2004 | Talwar et al. |
| 2004/0251242 | A1 | 12/2004 | Suh |
| 2005/0178750 | A1 | 8/2005 | Cheng et al. |
| 2006/0049153 | A1 | 3/2006 | Cahoon et al. |
| 2006/0102601 | A1 | 5/2006 | Shirk et al. |
| 2006/0283705 | A1 | 12/2006 | Tanase et al. |
| 2007/0023403 | A1 | 2/2007 | Emiljanow |
| 2008/0029495 | A1 | 2/2008 | Emiljanow et al. |
| 2010/0078411 | A1 | 4/2010 | Hughes et al. |
| 2010/0326969 | A1 | 12/2010 | Tsukamoto |
| 2011/0056919 | A1 | 3/2011 | Burbaum et al. |
| 2011/0089151 | A1 | 4/2011 | Miyagi et al. |
| 2011/0168092 | A1 | 7/2011 | Clark et al. |
| 2011/0240607 | A1 | 10/2011 | Stecker et al. |
| 2011/0297658 | A1 | 12/2011 | Peters et al. |
| 2012/0145771 | A1 | 6/2012 | Bohlin |
| 2012/0156020 | A1 | 6/2012 | Kottilingam et al. |
| 2012/0199564 | A1 | 8/2012 | Washko, Jr. |
| 2014/0072438 | A1 | 3/2014 | Bruck et al. |
| 2015/0048058 | A1 | 2/2015 | Bruck et al. |
| 2015/0048064 | A1 | 2/2015 | Cheverton et al. |

FOREIGN PATENT DOCUMENTS

| | | |
|---|---|---|
| CN | 132275058 A | 12/2011 |
| CN | 102424971 A | 4/2012 |
| DE | 102007032190 | 1/2009 |
| DE | 102010060162 | 12/2011 |
| EP | 0555896 | 8/1993 |
| EP | 2343148 | 7/2011 |
| EP | 2395199 | 12/2011 |
| GB | 2378150 | 2/2003 |
| GB | 2453943 | 4/2009 |
| JP | 2007029977 | 2/2007 |
| JP | 201000534 A | 1/2010 |
| WO | 03042895 | 5/2003 |
| WO | 2004039531 | 5/2004 |
| WO | 2012109086 | 8/2012 |

* cited by examiner

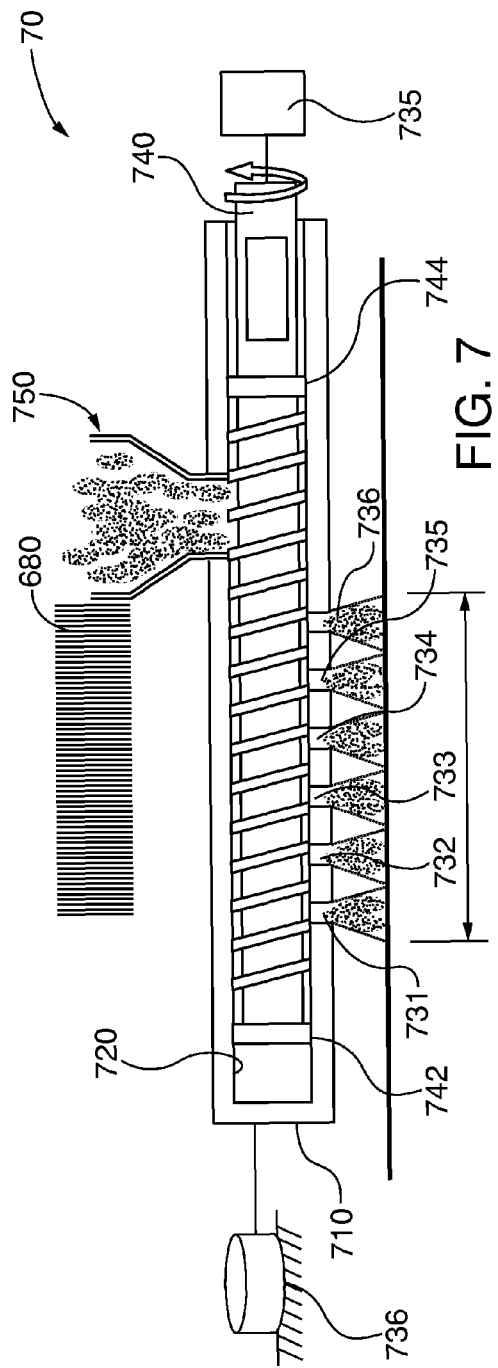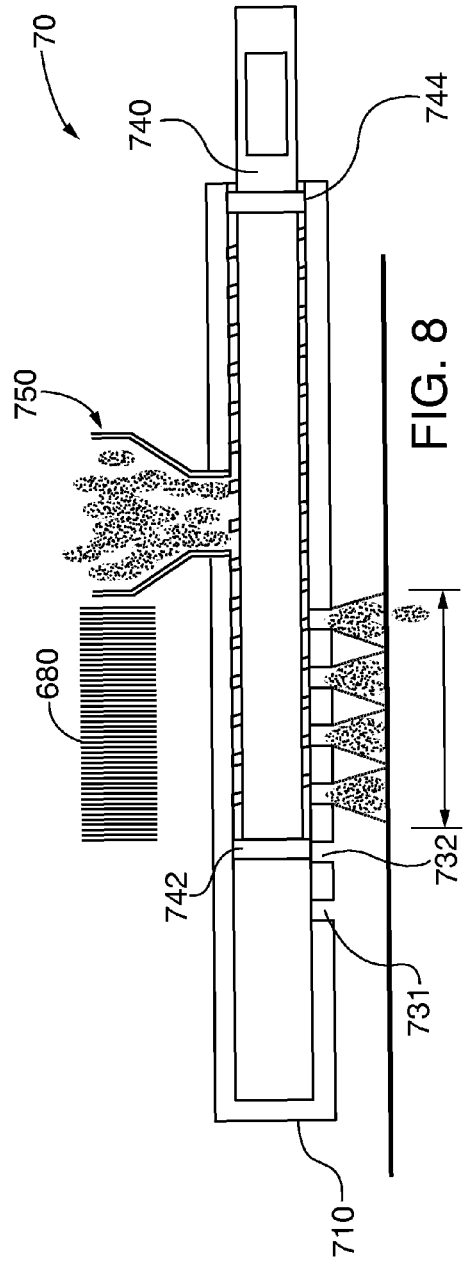

AUTOMATED SUPERALLOY LASER CLADDING WITH 3D IMAGING WELD PATH CONTROL

CROSS-REFERENCE TO RELATED APPLICATIONS

This application claims the benefit of priority to commonly owned, co-pending U.S. utility patent application entitled "SUPERALLOY LASER CLADDING WITH SURFACE TOPOLOGY ENERGY TRANSFER COMPENSATION", filed Sep. 12, 2012 and assigned Ser. No. 13/611,034; U.S. utility patent application entitled "LASER CLADDING SYSTEM FILLER MATERIAL DISTRIBUTION APPARATUS", filed Sep. 12, 2012 and assigned Ser. No. 13/611,144; and U.S. utility patent application entitled "METHOD FOR AUTOMATED SUPERALLOY LASER CLADDING WITH 3D IMAGING WELD PATH CONTROL, filed Jul. 8, 2013 and assigned Ser. No. 13/936,395, all of which are incorporated by reference herein.

BACKGROUND OF THE INVENTION

1. Field of the Invention

The invention relates to systems or methods for cladding superalloy components, such as service-degraded turbine blades and vanes, by laser beam welding. The welding/cladding path is determined by prior, preferably real time, non-contact 3D dimensional scanning of the component and comparison of the acquired dimensional scan data with specification dimensional data for the component. A welding path for cladding the scanned component to conform its dimensions to the specification dimensional data is determined. The laser welding apparatus, preferably in cooperation with a cladding filler material distribution apparatus, executes the welding path. In some embodiments a post weld non-contact 3D dimensional scan of the welded component is performed and the post weld scan dimensional data are compared with the specification dimensional data. Preferably the welding path and/or cladding application are modified in a feedback loop with the pre- and/or post-welding 3D dimensional scanning.

2. Description of the Prior Art

"Structural" repair of gas turbine or other superalloy components is commonly recognized as replacing damaged material with matching alloy material and achieving properties, such as strength, that are close to the original manufacture component specifications (e.g., at least seventy percent ultimate tensile strength of the original specification). For example, it is preferable to perform structural repairs on turbine blades that have experienced surface cracks, so that risk of further cracking is reduced, and the blades are restored to original material structural and dimensional specifications.

Repair of nickel and cobalt based superalloy material that is used to manufacture turbine components, such as turbine blades, is challenging, due to the metallurgic properties of the finished blade material. The finished turbine blade alloys are typically strengthened during post casting heat treatments, which render them difficult to perform subsequent structural welding. When a blade constructed of such a superalloy material is welded with filler metal of the same or similar alloy, the blade is susceptible to solidification (aka liquation) cracking within and proximate to the weld, and/or strain age (aka reheat) cracking during subsequent heat treatment processes intended to restore the superalloy original strength and other material properties comparable to a new component.

One known superalloy joining and repair method that attempts to melt superalloy filler material without thermally degrading the underlying superalloy substrate is laser beam welding, also known as laser beam micro cladding. Superalloy filler material (often powdered filler) compatible with or identical to the superalloy substrate material is pre-positioned on a substrate surface prior to welding or sprayed on the surface with pressurized gas through a channel during the cladding process. A "spot" area of focused laser optical energy generated by a fixed-optic laser (i.e., other than relative translation, laser and substrate have a fixed relative orientation during laser beam application) liquefies the filler material and heats the substrate surface sufficiently to facilitate good coalescence of the filler and substrate material, that subsequently solidify as a clad deposit layer on the substrate surface. Compared to other known traditional welding processes, laser beam micro-cladding is a lower heat input process, with relatively good control over melting of the substrate and rapid solidification that reduces propensity to cause previously-described solidification cracking. Lower heat input to the superalloy substrate during laser welding/cladding also minimizes residual stresses that otherwise would be susceptible to previously described post-weld heat treatment strain age cracking. While laser cladding welds have structural advantages over traditionally-formed welds, practical manufacturing and repair realities require larger cladding surface area and/or volume coverage than can be filled by any single pass applied cladding deposit.

To meet needs for adding volume to superalloy components, a laser-cladded deposit on a substrate can be formed from single- or two-dimensional arrays of adjoining solidified clad passes. Multiple laser-welded cladding passes and layers can be applied, under automated control, to build surface dimensional volume. Creating arrays of laser-clad deposits often results in microcracks and defects in the deposited material and underlying substrate in the heat affected zone material. Some defects are related to lack of fusion (LoF) that is common when there is insufficient localized laser optical energy heat input. Often a substrate, such as a turbine blade, requires structural repair filling of a missing volume of the blade substrate material with an equivalent volume of superalloy filler, in order to restore the blade's original structural dimensions. In known laser cladding techniques the missing blade substrate volume is filled with a two-dimensional filler weld array of individually-applied laser clad deposits or passes. The laser beam focus position and substrate surface are moved relative to each other under automated control after a single deposit formation to weld the next deposit, analogous to a series of abutting, overlapping bumps or dots. With known multi-dimensional filler material depositing equipment, either a layer of the filler particles (often in powder form) are prepositioned in a layer on the substrate surface or directed through a pressurized gas-fed nozzle over the laser "spot" projected location.

Automated or semi-automated laser weld repair of superalloy turbine component substrates requires definition of each part geometry for tracking purposes, so that the laser cladding path applies solidified deposits on the component's desired surface portions. Component measured actual geometric outline information is compared with desired component specification geometric outline information. The comparison identifies component undersized surface portions in need of solidified filler. The comparison information is used to program the laser cladding or welding path, with expectation that the newly filled portions will meet or exceed the desired specification dimensions. If the newly filled portions of the welded component remain undersized the component must be remeasured and rewelded with a second welding path. After application of one or more welding paths the welded component is inspected for weld quality. Voids or cracks remaining after or created by during the welding process may render the component unsuitable for service, in which case the prior welding effort and expense was wasted. If the post welding inspection indicates that the part is serviceable any post weld excess material is removed by known metal working processes.

In known welding processes component or part outline geometric information is typically collected before repair processing by a camera and defined by contrast measurement. An optical camera, which may be in a machine vision subsystem of an automated welding system, captures a visual image of the turbine component outline. Optical contrast is used to define the component outline or footprint. The automated welding system utilizes the optically defined component outline and the component's desired dimensional specification outline to establish the welding path of relative movement between the component and welding spot (i.e. part movement on a motion control work table, or movement of the welding equipment, or both). The welding system, executing the welding path, dads the component surface to fill missing volume between the actually defined outline dimensions obtained by the optical camera system and specification dimensions.

Traditional optical methods to define repaired component geometry and outline require specialized part illumination and are lacking in resolution and precision. The optical measurement methods only generate planar two dimensional outline information, with the height dimension effectively only inferred by shadow resolution. Thus the welding path executed by the welding apparatus only approximates the two dimension outline of the component. The filler height determination is determined empirically by the welding operator or the automated welding path processor by estimating the number of successive layers needed to obtain the component specification height dimensions. Traditional optical component measurement methods can not be used during repair as feedback to adjust processing equipment in case of component part change in physical condition (e.g., thermal distortion), movement, misalignment of component surface and welding, misguided weld path, or creation of weld defects (e.g., voids and/or cracks) apparatus during repair. Besides the previously identified optical measurement system illumination, resolution and precision deficiencies they cannot obtain visual images through smoke and high-intensity ultraviolet (UV) emissions generated by the laser cladding/welding system during the welding process. Smoke scatters reflected optical camera illumination and high intensity UV emissions overpower the optical camera's ability to capture a visual image.

U.S. Pat. No. 5,504,303 proposes use of a non-contact laser profilometer to obtain 3D dimensional topography measurement information of a diamond surface. The measured information is compared to desired specification information. Subsequently an ablation laser cuts surface portions identified as being too thick compared to the desired specification. The cut surface is subsequently re-scanned with the laser profilometer to determine whether the surface now meets the desired thickness specification. Cutting and scanning are repeated sequentially until the surface conforms to the desired specification. It is further stated in the patent that the profilometer and ablation system can utilize a common laser device.

Thus, a need exists in the art for turbine component laser cladding systems or methods that in real time acquire component dimensional data, compare the acquired dimensional data with specification dimensional data and determine a welding pattern for building up the component surface in conformity with the determined welding pattern, so that the welding pattern is dynamically determined and is adjusted in response to transient changes occurring during the welding process. Examples of such transient changes include but are not limited to component thermal distortion, movement and/or misalignment of the component surface and the welding apparatus, misguided weld path, or creation of weld defects (e.g., voids and/or cracks) during the welding process.

Another need exists in the art for turbine component laser cladding systems or methods that in real time perform subsequent post weld measurement of the component surface and determining whether the post weld surface measurement data are in conformity with desired specification dimensional data and/or weld quality (e.g., lack of voids and/or microcracks in the welded surface). To meet this need, the systems or methods preferably incorporate the post weld measurement and/or inspection within a real time feedback loop to adjust the welding process dynamically, so that the welded surface is formed in conformity with desired specifications.

An additional need exists in the art for turbine component laser cladding systems or methods that in real time or sequentially acquire dimensional data, compare acquired dimensional data with specification data, determine a welding path and welding processes for building up the component surface in in conformity with the determined welding pattern, and performing the welding by transferring optical energy from the welding laser to the filler material and substrate that fuses the filler material to the substrate as a filler layer without causing thermal degradation to the substrate. To meet this need to avoid thermal degradation the systems or methods preferably vary optical energy transfer based on component surface topology.

Yet another need exists in the art for turbine component laser cladding systems or methods that acquire dimensional data in spite of smoky conditions and/or ultraviolet emissions caused during the laser welding process, whether the acquisition occurs in real time or sequentially with the laser welding process.

SUMMARY OF THE INVENTION

Accordingly, an object is to create turbine component laser cladding systems or methods that in real time acquire component dimensional data, compare the acquired dimensional data with specification dimensional data and determine a welding pattern for building up the component surface in conformity with the determined welding pattern, so that the welding pattern is dynamically determined and is adjusted in response to transient changes occurring during the welding process. Examples of such transient changes include but are not limited to component thermal distortion, movement and/or misalignment of the component surface and the welding apparatus, misguided weld path, or creation of weld defects (e.g., voids and/or cracks) during the welding process.

Another object is to create turbine component laser cladding systems or methods that in real time perform subsequent post weld measurement of the component surface and determine whether the post weld surface measurement data are in conformity with desired specification dimensional data and/or weld quality (e.g., lack of voids and/or microcracks in the welded surface). Such systems or methods preferably incorporate the post weld measurement and/or inspection within a real time feedback loop to adjust the welding process dynamically, so that the welded surface is formed in conformity with desired specifications.

An additional object is to create turbine component laser cladding systems or methods that in real time or sequentially: acquire dimensional data, compare acquired dimensional data with specification data, determine a welding path and welding processes for building up the component surface in in conformity with the determined welding pattern, and perform the welding by transferring optical energy from the welding laser to the filler material and substrate that fuses the filler material to the substrate as a filler layer without causing thermal degradation to the substrate. To meet this need to avoid thermal degradation the systems or methods preferably vary optical energy transfer based on component surface topology.

Yet another object is to create turbine component laser cladding systems or methods that acquire dimensional data in spite of smoky conditions and/or ultraviolet emissions caused during the laser welding process, whether the acquisition occurs in real time or sequentially with the laser welding process.

These and other objects are achieved by laser cladding systems or methods of the present invention, wherein turbine components, such as service-degraded superalloy turbine blades and vanes, are clad by laser beam welding. The welding/cladding path, including cladding application profile, is determined by prior, preferably dynamic real time, non-contact 3D dimensional scanning of the component and comparison of the acquired dimensional scan data with specification dimensional data for the component. A welding path for cladding the scanned component to conform its dimensions to the specification dimensional data is determined. The laser welding apparatus, preferably in cooperation with a cladding filler material distribution apparatus, executes the welding path to apply the desired cladding profile. In some embodiments a post-weld non-contact 3D dimensional scan of the welded component is performed and the post-weld scan dimensional data are compared with the specification dimensional data. Preferably the welding path and/or cladding profile application are modified dynamically in a real time feedback loop with the pre- and/or post-welding 3D dimensional scanning. In this preferred exemplary manner the welding pattern (path and/or profile) is dynamically determined and is adjusted in real time in response to transient changes occurring during the welding process. Examples of such transient changes include but are not limited to component thermal distortion, movement and/or misalignment of the component surface and the welding apparatus, misguided weld path, or creation of weld defects (e.g., voids and/or cracks) during the welding process. Embodiments of the present invention acquire dimensional data in spite of smoky conditions and/or ultraviolet emissions caused during the laser welding process, whether the acquisition occurs in real time or sequentially with the laser welding process.

Embodiments of the invention feature a system for cladding a turbine component having a substrate and a surface with a filler layer, which includes a work table apparatus for receipt of a turbine component substrate thereon, having a work table interface. The system also has a laser profilometer apparatus for scanning a surface of the turbine component substrate and acquiring component dimensional data. The profilometer apparatus has: a scanning laser generating a scanning laser beam for reflecting optical energy off the turbine component surface; at least one movable scanning mirror intercepting the scanning laser beam, for orienting the scanning laser beam on the substrate surface; and a laser profilometer apparatus drive system interface coupled to the scanning laser and the at least one movable scanning mirror, for causing relative movement between the laser and mirror. The system further has a cladding filler material distribution apparatus for introducing filler material on the component substrate, which includes a laser welding apparatus for transferring optical energy to the turbine component substrate and filler material on the substrate that fuses the filler material to the substrate as a built up filler layer that is applied as a welding pattern. The welding apparatus has: a welding laser generating a welding laser beam for transferring optical energy; at least one movable welding mirror intercepting the welding laser beam, for orienting the laser beam on the substrate; and a welding laser apparatus drive system interface coupled to the welding laser and the at least one movable welding mirror for causing relative movement between the mirror and laser. A drive system is operatively coupled to the work table, the profilometer, the cladding filler material distribution apparatus, the laser welding apparatus and their respective drive interfaces, for operating the apparatuses and providing controlled relative motion there between. A control system is operatively coupled to each of the recited apparatuses and their drive interfaces, for acquiring component dimensional data with the laser profilometer apparatus and comparing the acquired component dimensional data with component specification dimensional data. Based on the data comparison the controller determines respective filler introduction and/or welding patterns for cladding component substrate surface portions to conform welded component dimensions to the specification dimensional data. The controller causes the filler apparatus and the laser welding apparatus execute their respective patterns in order to clad the component substrate.

Other embodiments of the invention feature a system for cladding a turbine component having a substrate and a surface with a filler layer, and includes a work table apparatus for receipt of a turbine component substrate thereon, having a work table interface, as well as a laser profilometer apparatus for scanning a surface of the turbine component substrate in real time and acquiring component dimensional data. The profilometer has: a scanning laser generating a scanning laser beam for reflecting optical energy off the turbine component surface; at least one movable scanning mirror intercepting the scanning laser beam, for orienting the scanning laser beam on the substrate surface; and a laser profilometer apparatus drive system interface coupled to the scanning laser and the at least one movable scanning mirror, for causing relative movement between the laser and mirror. The system also includes a cladding filler material distribution apparatus for introducing filler material on the component substrate, having: a distribution apparatus housing having an external surface defining a distribution aperture and an internal chamber in communication with the distribution aperture adapted for retention of filler material therein; a feed mechanism adapted for selectively feeding filler material from the internal chamber through the distribution aperture; and a feed mechanism drive system interface coupled to the feed mechanism, for selectively feeding filler material from the internal chamber through the distribution aperture. The system also has a laser welding apparatus for transferring optical energy to the turbine component substrate and filler material on the substrate that fuses the filler material to the substrate as a built up filler layer that is applied as a welding pattern. The welding apparatus has: a welding laser generating a welding laser beam for transferring optical energy; at least one movable welding mirror intercepting the welding laser beam, for orienting the laser beam on the substrate; and a welding laser apparatus drive system interface coupled to the welding laser and the at least one movable welding mirror for causing relative movement between the laser and mirror. A drive system is operatively coupled to the work table, the profilometer, the cladding filler material distribution apparatus, the laser welding apparatus and their respective drive interfaces, for operating the apparatuses and providing controlled relative motion between them. A control system is operatively coupled to each of the aforementioned apparatuses and their drive interfaces, for: acquiring component dimensional data with the laser profilometer apparatus in real time; comparing the acquired component dimensional data with component specification dimensional data in real time. Based on the comparison the controller determines respective filler introduction and welding patterns for cladding component substrate surface portions to conform welded component dimensions to the specification dimensional data in real time; and causes the filler apparatus and the laser welding apparatus execute their respective patterns in real time in order to clad the component substrate.

Other embodiments of the invention feature a system for cladding a turbine component having a substrate and a surface with a filler layer. The system has a movable work table apparatus driven by a motion control system, for receipt of a turbine component substrate thereon, having a work table interface. The system has a laser profilometer apparatus for scanning a surface of the turbine component substrate in real time and acquiring component dimensional data. The profilometer apparatus has: a scanning laser generating a scanning laser beam for reflecting optical energy off the turbine component surface; at least one movable scanning mirror intercepting the scanning laser beam, for orienting the scanning laser beam on the substrate surface; and a laser profilometer apparatus drive system interface coupled to the scanning laser and the at least one movable scanning mirror, for causing relative movement between the laser and mirror. The system further includes a cladding filler material distribution apparatus for introducing filler material on the component substrate, having: a distribution apparatus housing having an external surface defining a distribution aperture and an internal chamber in communication with the distribution aperture that is adapted for retention of filler material therein. A feed mechanism is adapted for selectively feeding filler material from the internal chamber through the distribution aperture. A feed mechanism drive system interface is coupled to the feed mechanism, for selectively feeding filler material from the internal chamber through the distribution aperture. A laser welding apparatus transfers optical energy to the turbine component substrate and filler material on the substrate that fuses the filler material to the substrate as a built up filler layer that is applied as a welding pattern. The welding apparatus has: a welding laser generating a welding laser beam for transferring optical energy; at least one movable welding mirror intercepting the welding laser beam, for orienting the laser beam on the substrate; and a welding laser apparatus drive system interface coupled to the welding laser and the at least one movable welding mirror for causing relative movement between the laser and mirror. In the system a second laser profilometer apparatus is oriented downstream of the laser welding apparatus for scanning the surface of the clad turbine component substrate and acquiring post-weld component dimensional data. A drive system is operatively coupled to the work table, the profilometer, the cladding filler material distribution apparatus, the laser welding apparatus and their respective drive interfaces, for operating the apparatuses and providing controlled relative motion therebetween. The system also features a control system that is operatively coupled to each of the aforementioned apparatuses and their drive interfaces, for: acquiring component dimensional data with the laser profilometer apparatus in real time; comparing the acquired component dimensional data with component specification dimensional data in real time; and based on the comparison of dimensional data: determining respective filler introduction and welding patterns for cladding component substrate surface portions to conform welded component dimensions to the specification dimensional data in real time; causing the filler apparatus and the laser welding apparatus to execute their respective patterns in real time in order to clad the component substrate in real time; and comparing the post-weld component dimensional data with component specification dimensional data. Based on the comparison the controller alters respective filler introduction and/or welding patterns for cladding component substrate surface portions to conform welded component dimensions to the specification dimensional data in real time.

The objects and features may be applied jointly or severally in any combination or sub-combination by those skilled in the art, including with other features described herein.

BRIEF DESCRIPTION OF THE DRAWINGS

The teachings of the present invention can be readily understood by considering the following detailed description in conjunction with the accompanying drawings, in which:

FIG. 7 is an axial cross sectional view of an embodiment of a filler material distribution apparatus distributing filler material across a substrate surface area in advance of the welding system laser beam rastering pattern welding path first width;

FIG. 8 is an axial cross sectional view of the filler material distribution apparatus of FIG. 7 distributing filler material across a substrate surface area in advance of the laser welding system beam rastering pattern welding path second narrower width than the width shown in FIG. 7;

To facilitate understanding, identical reference numerals have been used, where possible, to designate identical elements that are common to the figures.

DETAILED DESCRIPTION

Figure 1:
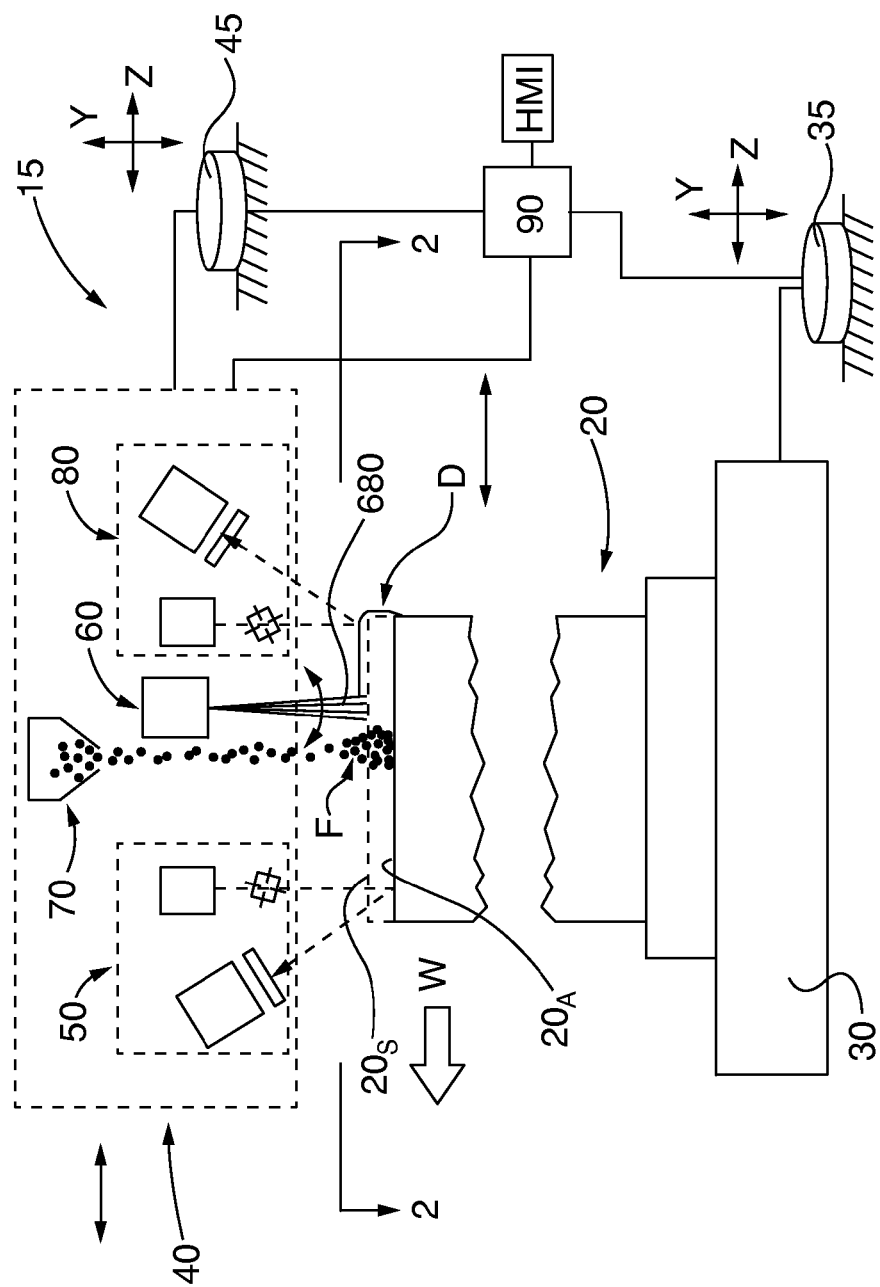
FIG. 1 is a side elevational view of an embodiment of a turbine component welding system welding a superalloy turbine blade.

After considering the following description, those skilled in the art will clearly realize that the teachings of the present invention can be readily utilized in laser cladding systems or methods, wherein turbine components, such as service-degraded superalloy turbine blades and vanes, are clad by laser beam welding. The welding/cladding path, including cladding application profile, is determined by prior, preferably dynamic real time, non-contact 3D dimensional scanning of the component and comparison of the acquired dimensional scan data with specification dimensional data for the component. A welding path for cladding the scanned component to conform its dimensions to the specification dimensional data is determined. The laser welding apparatus, preferably in cooperation with a cladding filler material distribution apparatus, executes the welding path to apply the desired cladding profile.

In some embodiments described herein a post-weld non-contact 3D dimensional scan of the welded component is performed and the post-weld scan dimensional data are compared with the specification dimensional data. Preferably the welding path and/or cladding profile application are modified dynamically in a real time feedback loop with the pre- and/or post-welding 3D dimensional scanning. In this preferred exemplary manner the welding pattern is dynamically determined and is adjusted in real time in response to transient changes occurring during the welding process. Examples of such transient changes include but are not limited to component thermal distortion, movement and/or misalignment of the component surface and the welding apparatus, misguided weld path, or creation of weld defects (e.g., voids and/or cracks) during the welding process.

The welding process is accomplished by transferring optical energy from the welding laser to the filler material and substrate that fuses the filler material to the substrate as a filler layer without causing thermal degradation to the substrate. In embodiments described herein, thermal degradation of the component substrate is avoided by varying optical energy transfer based on component surface topology, so that uniform energy is transferred to the substrate and filler material. In embodiments of the present invention uniform energy transfer may be attained during the welding process by one or more of: varying relative movement rate of the substrate and welding laser beam; varying laser power output; rastering the welding laser beam and substrate relative to each other; translating and oscillating the substrate and welding laser beam relative to each other along the welding pattern path; varying filler material composition, introduction rate or dispersal pattern; or monitoring energy transfer with the control system in a closed feedback loop and varying energy transfer rate based on the monitored energy transfer. Embodiments of the present invention acquire dimensional data in spite of smoky conditions and/or ultraviolet emissions caused during the laser welding process, whether the acquisition occurs in real time or sequentially with the laser welding process.

Figure 2A:
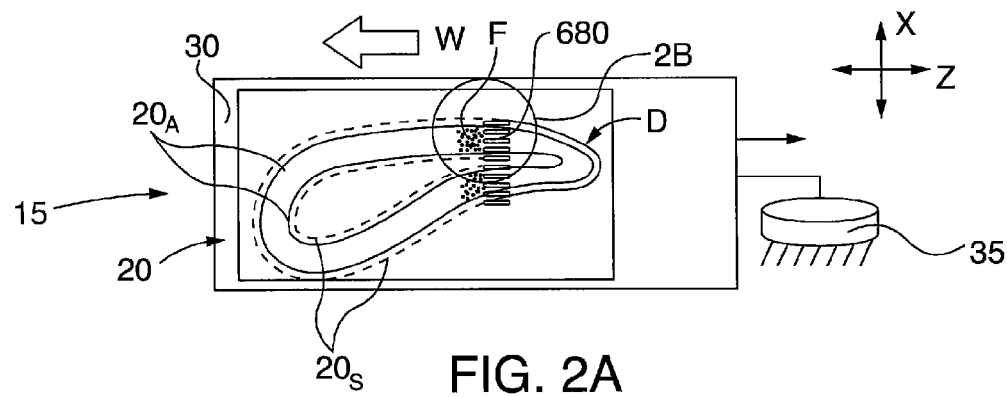
FIG. 2A is a plan view if the turbine component welding system welding a superalloy turbine blade, that is taken along 2-2 of FIG. 1.
Figure 2B:
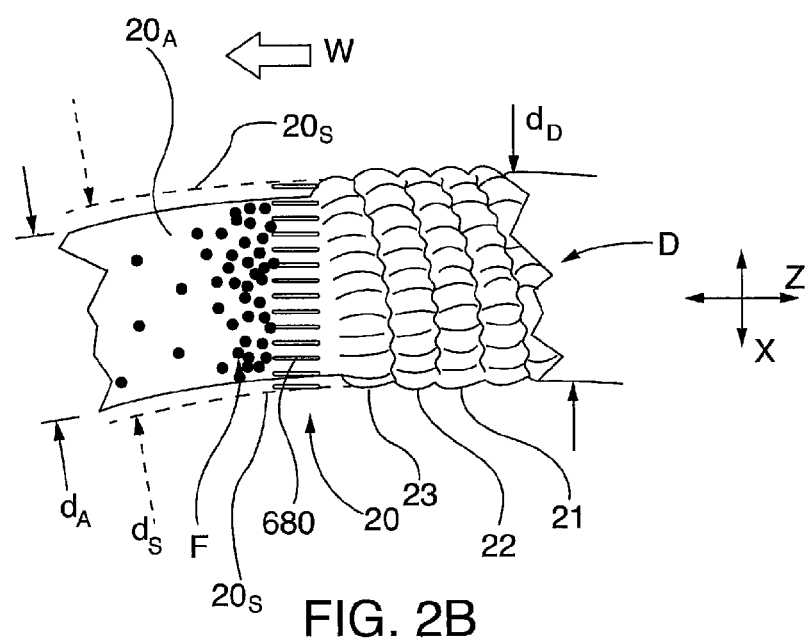
FIG. 2B is a detailed plan view of a the superalloy turbine blade of FIG. 2A showing a welded zone including the bare blade, filler material deposited on the blade upstream of the laser beam, the actively clad portion within the laser beam and post-weld deposit downstream of the laser beam.

An exemplary embodiment of an automated laser cladding system 15 is shown in FIGS. 1, 2A and 2B. A turbine component, such as the superalloy turbine blade 20 has a service degraded, worn tip surface $20_A$ compared to the dashed line desired blade tip specification dimensions $20_S$ of a new blade. More particularly in FIG. 2B the portion of the blade tip squealer $20_A$ upstream of the welding laser beam oscillating scan 680 has a measured dimensional width $d_A$ that is narrower than the specification width $d_S$. Powder filler F that is deposited on the worn tip surface $20_A$ is fused to the component substrate tip surface by the welding laser beam oscillating scan 680. Successive rastered laser welding passes of the beam 680 forms laterally joined deposits 21-23 to form a continuous filler layer deposit D having a width $d_D$ that is slightly wider than the specification width $d_S$. Normally after satisfactory post weld inspection of the blade the excessive width is removed by known metal working processes, such as grinding. The arrow W signifies directional movement of the laser beam 680 relative to the substrate 20. It follows that the directional movement of the substrate relative to the laser beam 680 is opposite that of the arrow W. In preferred embodiments the laser welding process is performed continuously and dynamically in real time along a defined path in the direction W.

Figure 3:
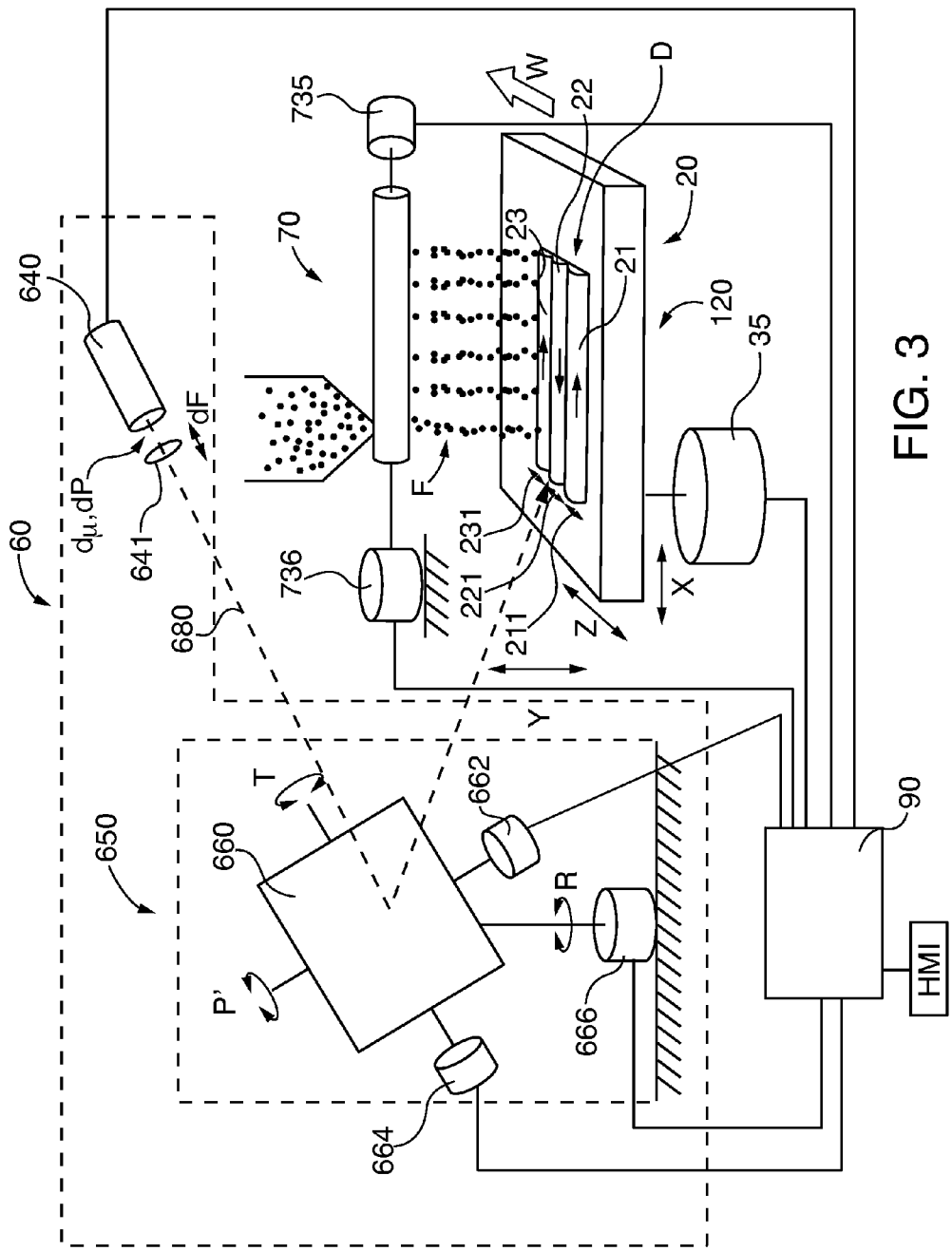
FIG. 3 is a schematic view of an exemplary embodiment of an automated laser cladding system, incorporating a work table for the component to be clad, pre-weld scanning laser profilometer, laser welding system, filler material distribution apparatus and post-weld scanning laser profilometer.

FIG. 3 (and commensurate details shown in FIGS. 4 and 5) is a schematic view of an exemplary embodiment of an automated laser cladding system 15, incorporating a work table 30 for the component substrate 20 that is to be clad, pre-weld scanning laser profilometer 50, laser welding system 60, filler material distribution apparatus 70 and optional post-weld scanning laser profilometer 80. More particularly, the cladding system 15 includes a work table 30 to which is affixed a turbine blade 20 or other turbine component substrate. Optional work table motion control system 35 is used to move the work table 30 in the X, Y and Z coordinates shown or in any other single- or multi-axis coordinate system. A cladding system gantry 40, shown schematically in dashed lines (FIG. 1), optionally is coupled to a gantry motion control system 45 to move the work table 30 in the X, Y and Z coordinates shown or in any other single- or multi-axis coordinate system. One or both of the motion control systems 45 or 35 are used to impart relative motion between the gantry 40 and the substrate 20 so that a weld cladding pattern can be formed on the substrate surface.

Gantry 40 includes a pre-weld non-contact laser profilometer 50 for acquiring substrate 20 3D dimensional data, a laser welding apparatus 60 generating a welding laser beam 680, and a filler material distribution system 70 for selectively depositing filler F on the substrate surface for eventual fusion by the welding laser beam to form the solidified deposit D. Optional post-weld non-contact laser profilometer 80 acquires post-weld dimensional data. The cladding system 15 operates under control of controller 90, which preferably has a human machine interface (HMI) for human operator monitoring, supervision and alteration of the welding apparatus and its welding methods. Construction and operation of the filler distribution system 70 are described in U.S. patent application Ser. No. 13/611,144 that was previously cited herein. The filler material distribution apparatus 70 facilitates uniform distribution of filler material across a welding pattern path: whether a series of serially deposited welds generated by known cladding systems and methods or multi-dimensional rastered continuous weld patterns that are performed by the laser welding system 60 and its methods that are described in U.S. patent application Ser. No. 13/611,034 that was previously cited herein.

FIGS. 1 and 3 show schematically the gantry 40, laser welding apparatus 60 and the filler material distribution apparatus 70. The welding apparatus 60 is a continuous path weld laser cladding welding apparatus of the type disclosed in U.S. patent application Ser. No. 13/611,034. As in FIG. 2A, the cladding system 15 includes a work table 30 to which is affixed a turbine component substrate 20, such as a superalloy material turbine blade or vane. Optional work table motion control system 35 is used to move the work table 30 in the X, Y and Z coordinates shown or in any other single- or multi-axis coordinate system. The filler material distribution system 70 introduces powdered filler material F that is suitable for welding the substrate 20 surface in a multi-dimensional (here two-dimensional) pattern to match the raster pattern of the welding apparatus 60. For example, if the substrate is a superalloy the filler material is often a powder of the same or compatible alloy. The distribution system 70 filler material feed rate is controlled by a filler drive system 735 that may be an electric motor drive. The distribution system 70 may have its own independent motion control system 736 for moving the poured filler material powder application zones relative to the substrate 20. Construction of the filler material distribution system apparatus 70 will be described in greater detail following the laser welding apparatus 60 general system description.

The welding apparatus 60 has a laser 640 with optional variable focus dF lens system 641 or power output dP that provides the laser beam 680 optical energy source for heating the substrate 20 surface and filler material F. The welding system 60 also has a moveable mirror system 650 with mirror 660 that is capable of single- or multi-axis movement, shown as tilt T, pan P and rotate R axes under control of respective drives 662, 664 and 666. The drives 662, 664 and 666 may be part of a known construction motorized motion control system or incorporated in a known galvanometer, that are under control of known controller 90. Alternately the beam may be intercepted by multiple mirrors with single (or multiple) axes of motion to achieve each of the afore-described axes movements.

The controller 90 may be a stand-alone controller, programmable logic controller or personal computer. The controller 90 may also control one or more of the work table 30 motion control system 35, the gantry 40 motion control system 45, the powdered filler material distribution system 70 drive 735 and/or the optional powdered filler material distribution system drive motion control system 736, and/or the laser 640 variable focus dF and/or power output dP. Known open and/or closed feedback loops with the controller 90 may be associated with one or more of the drives 35, 45, 735, 736, 662-666, dF or dP. Laser beam optical energy transfer to the substrate and filler can also be monitored in a closed feedback loop so that the controller can vary the energy transfer rate based on the monitored energy transfer rate. The human machine interface (HMI) may be used for monitoring welding operations and/or providing instructions for performing a welding operation.

Figure 4:
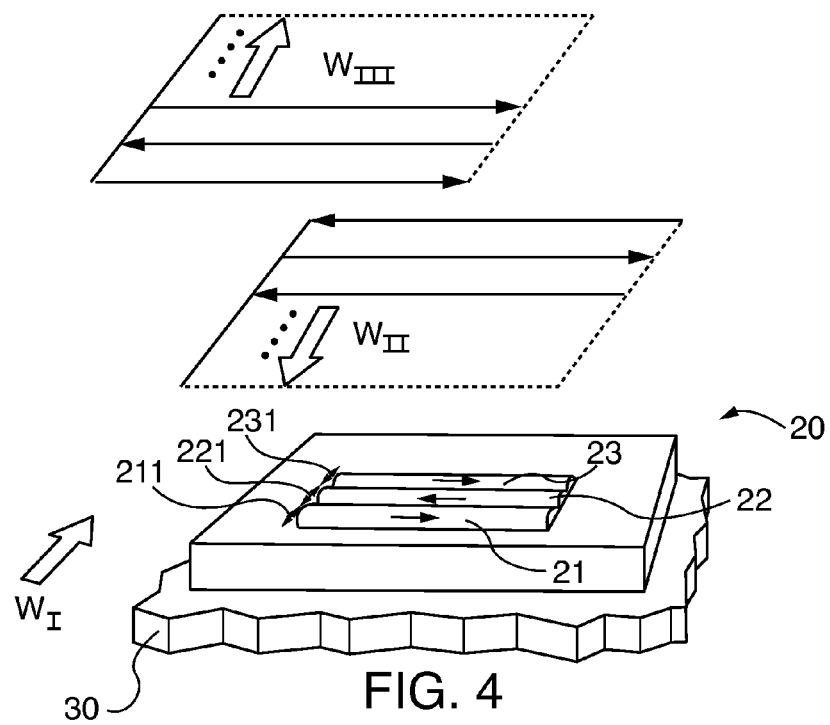
FIG. 4 shows is a schematic view of an exemplary multi-layer laser weld rastering pattern of cladding system of FIG. 3.

When operating the welding system 60 the output beam 680 of the laser 640 is reflected off mirror 660 (or multiple mirrors) and in turn on to the component substrate 20, which transfers optical energy to the substrate and filler material F. Both the substrate 20 and filler material F absorb the transferred optical energy, to melt the filler material, wet the substrate surface and fuse the melted filler and substrate surface to each other to form solidified deposit D. Referring to FIGS. 3 and 4, the substrate 20 and laser beam 680 are moved relative to each other along a translation path by the control system 90 engagement of any one or more of the work table drive system 35, gantry drive system 45 and/or the moveable mirror system 650 drives 662, 664, 666 to form a continuous welded cladding layer or deposit D. When the movable mirror system 650 is incorporated in a commercially available laser galvanometer system, relative motion between the substrate 20 and the laser beam 680 as well as the laser optical energy transfer rate can be varied by moving the galvanometer mirror 660 (or multiple mirrors) for both relative translation and oscillation. Relative motion between the laser beam 680 and the substrate 20/filler material F maintains a continuous melted weld line at the leading edge of translation motion (e.g., the right leading edge of the weld line 21 in FIGS. 4 and 5) for fusion uniformity that is not possible with known unoscillated laser cladding systems.

The welding laser 680 optical energy absorbed at any beam focus area varies proportionately with focus time duration. By non-limiting example laser beam 680 focus time duration and proportional absorbed energy can be varied in the following ways: (i) the laser beam 680 can be oscillated parallel to or side-to-side transverse (e.g., 211) the weld translation path 21; (ii) the oscillation or translation speed can be varied; and (iii) the laser power intensity dP or focus dF can be varied continuously or by pulse modulation. Thus by dynamically changing the rate of laser beam 680 focus time duration the energy transfer rate to the substrate and filler F is varied along the weld line translation path, so that uniform energy transfer is maintained within the entire weld, regardless of local topography variations.

As shown in FIGS. 3 and 4, a cladding layer may comprise a single raster linear weld 21 or a two-dimensional weld array of multiple adjoining linear welds 21, 22, and 23. Translation directions for each pass may be sequentially reversed as shown. Oscillation directions for each pass may be purely transverse to the translation direction as 211, 221 and 231 for each pass 21, 22 and 23 respectively. Duration of oscillation against the side of previous passes may be increased to ensure fusion. Multiple cladding layers may be applied on each other by sequentially alternating layers in directions ($W_I$, $W_{II}$, $W_{III}$) in and out of FIG. 4, or even changing directions of translation to other than left to right e.g. to 90 degrees from left to right. All of these multi-dimensional rastering patterns require uniform distribution of filler material on the substrate surface in advance of or in conjunction with the laser beam focusing on the filler material and substrate. The filler distribution system 70 facilitates uniform distribution of filler material on whatever variable size, multi-dimensional welding pattern "footprint" required for a specific cladding operation.

Figure 5:
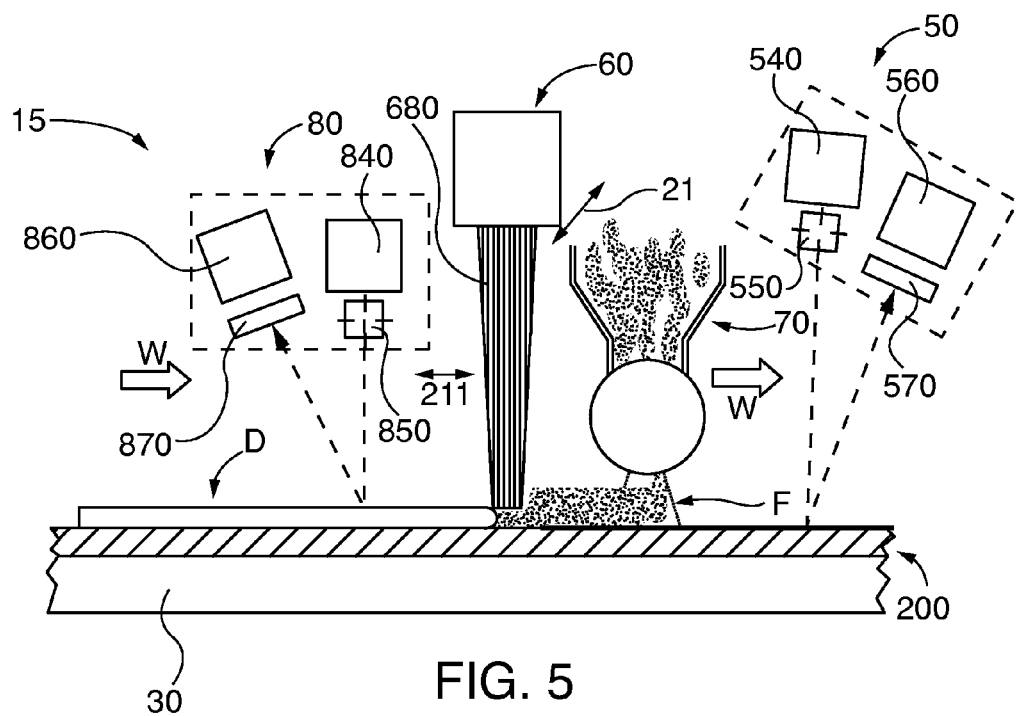
FIG. 5 is a schematic side elevational view of the filler material distribution apparatus of FIG. 3 distributing filler material on a substrate in advance of the laser welding system beam rastering pattern welding path.
Figure 6:
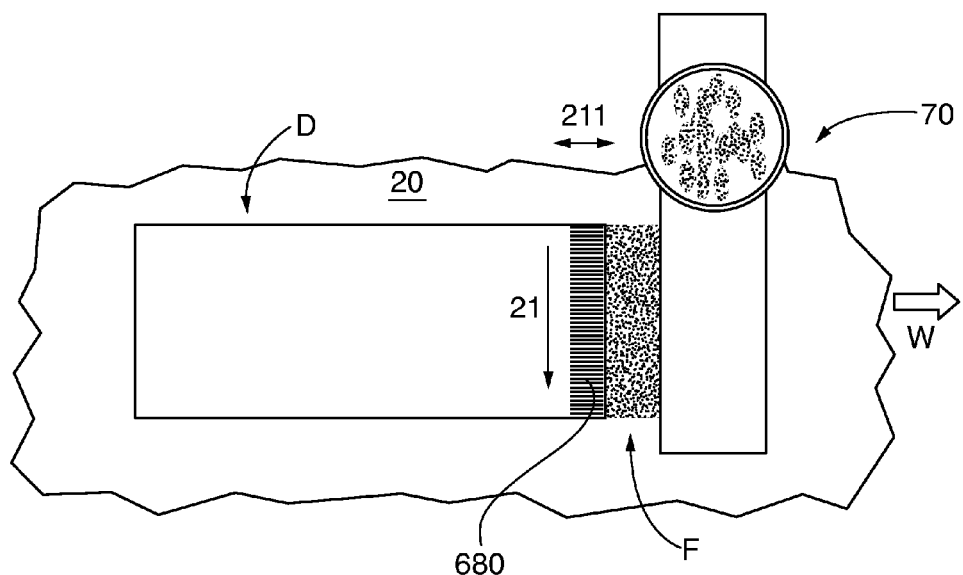
FIG. 6 is a schematic top plan view of the filler material distribution apparatus of FIGS. 3 and 5 distributing filler material on a substrate in advance of the laser welding system beam rastering pattern welding path.

In FIGS. 5 and 6, the filler material distribution system 70 is distributing powdered filler material F in advance of the laser beam 680 rastering pattern translation path 21 direction and the oscillation path 211 directional arrows of FIG. 4. In this embodiment the filler distribution system 70 is moving in tandem with the laser beam 680 in the direction of travel W. Alternatively the laser beam 680 and filler material distribution system 70 can be held in fixed position relative to each other while the substrate 20 is moved in an opposite direction relative to the arrow W.

FIG. 5 also shows more detailed construction of principal components within the known laser profilometers 50 and 80, which function similar to the laser welding system 60. Each of the respective profilometers 50, 80 has a corresponding laser source 540, 840, moving mirror 550, 850 that is operatively under control of the controller 90 for changing orientation of the laser beam generated by the corresponding laser source, and a detector 560, 860. Preferably each of the profilometers 50, 80 have known construction optical filters 570, 870 associated with each of their respective detectors 560, 860. The optical filters 570, 870 filter out frequency ranges of reflected electromagnetic frequencies generated during laser welding to reduce detector noise. The known optical filters may comprise mechano-optical filtering devices, such as coated lenses or electro-optical filters that filter detector output frequencies prior to profilometer scanning data processing.

Exemplary embodiments of the filler material distribution system 70 are shown in FIGS. 7-10. The distribution system 70 has a housing 710 (here tubular) that defines an internal cavity 720 and a plurality of filler material distribution apertures 731-736 (hereafter referred to as "apertures") through which the filler material is discharged. While six apertures are shown in this exemplary embodiment, their array pattern and size may be selectively varied in order to provide a desired filler material distribution pattern. The aperture array pattern, for example may be a linear pattern, as shown in FIGS. 7-10 or any desired polygonal pattern, e.g. rectangular, trapezoidal, etc. A rotating auger 740 mechanical feed mechanism is mounted in the housing 710 and has front seal 742 and rear seal 744 that set limits for filler material axial flow. Thus filler distribution flow width is bounded by the maximum spread of the apertures 731 and 736. The auger 740 is rotated by distribution drive system 735 under control of the controller 90, and transfers filler material from the supply hopper 750 to the aperture array 731-736 without assistance of pressurized gas, or alternatively with assistance of a limited amount of pressurized gas that does not disrupt the desired or acceptable filler material distribution pattern. While inert gas may still be needed for oxidation isolation during the welding process, that gas can be supplied independently, for example within a welding isolation chamber. Alternately, welding flux may be mixed with powdered filler metal or fed independently to provide such shielding function. Lack of pressurized gas-assisted filler feed eliminates the potential for gas flow eddy currents to disrupt the filler material distribution uniformity or to cause filler clumping. Filler material feed rate may be varied by varying the auger 740 rotational speed. Gross feed rates can be varied by changing the distribution aperture 731-736 dimensions (to be described later herein) or the dimensions of the auger thread pattern.

Figure 9:
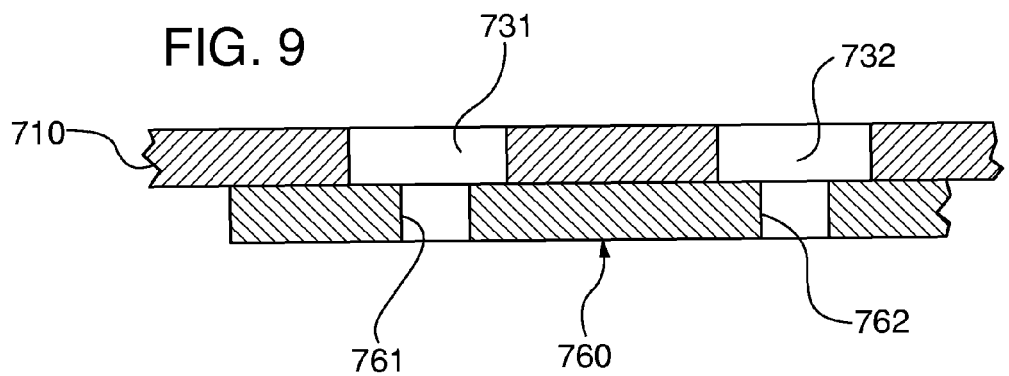
FIG. 9 is a partial cross sectional view of another exemplary embodiment of a filler material distribution apparatus, having selectively variable-sized distribution apertures.

Filler distribution system 70 feed width is selectively varied by changing auger 740 axial position within the housing 710. Comparing FIGS. 7 and 8, the feed width is narrowed by isolating one or more apertures 731, 732 from the auger 740. The filler material distribution may also be varied by changing distribution aperture size, as shown in FIG. 9. Here an orifice plate 760, having apertures 761, 762, etc., covers the larger corresponding apertures 731, 732, etc., in the housing 710. Other aperture size-varying known mechanisms may be substituted for the orifice plate 760, including by way of non-limiting example individually threaded orifices and adjustable shutters.

Figure 10:
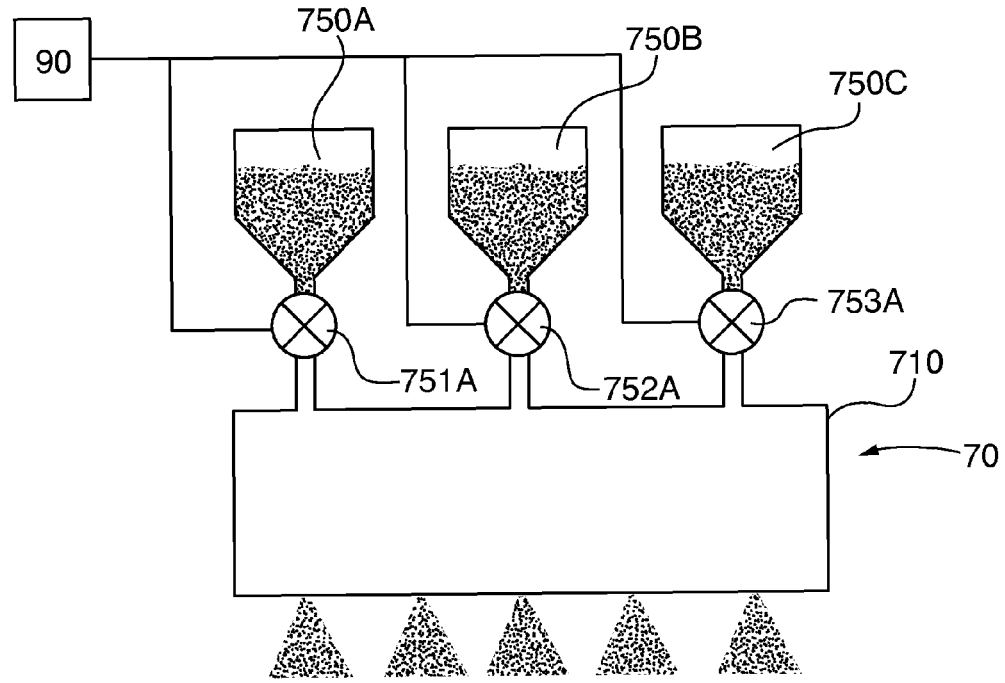
FIG. 10 is a partial cross sectional schematic view of another exemplary embodiment of a filler material distribution apparatus, having a plurality of filler material hoppers or bins, for selectively varying filler material composition applied to the substrate surface.

FIG. 10 shows an alternate embodiment of filler distribution system 70 that facilitates selective discharge of different filler material compositions retained in a plurality of hoppers 750A, 750B, 750C that are respectively individually in communication with by discharge valves 751A-C. The discharge valves selectively release filler material into the housing 710 under control of the controller 90.

Figure 11:
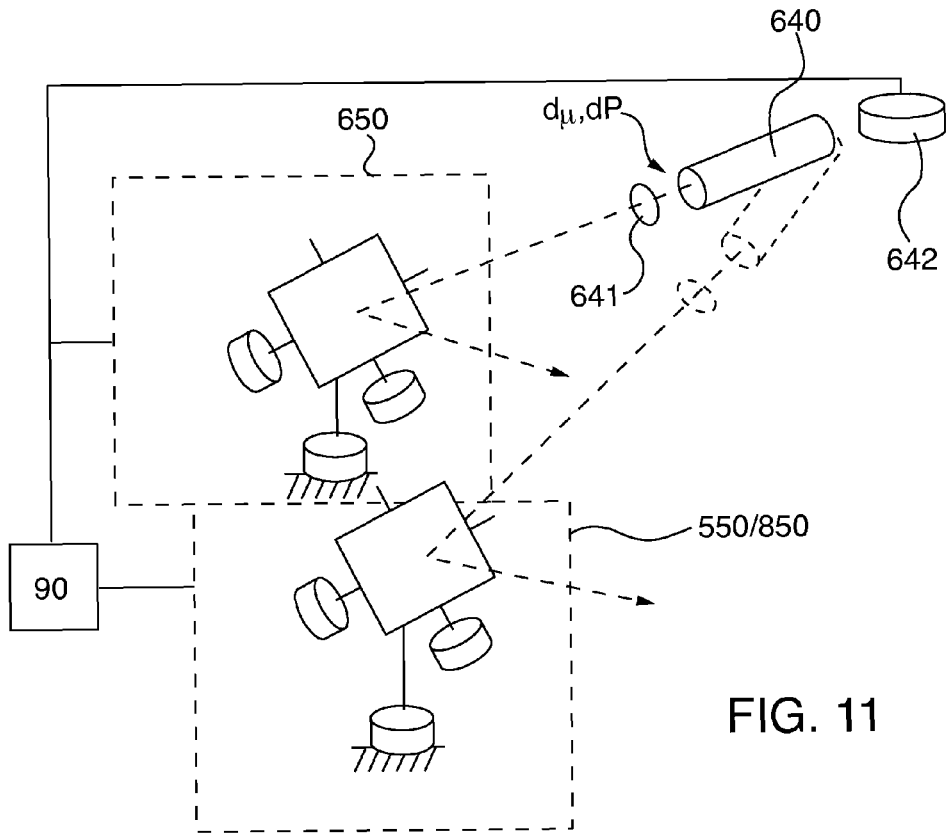
FIG. 11 is a schematic view of a scanning laser profilometer and laser welding system sharing a common laser source for 3D scanning and welding.

In the alternative embodiment of FIG. 11 two or more of the laser welding apparatus 60 or the laser profilometers 50, 80 share a common laser source 640 whose output beam is reflected by two or more of the moving mirror systems 550, 650, 850. The laser source 640 and its focusing system 641 may incorporate a laser drive system 642 operatively coupled to the control system 90, for multiplexing, focusing and reorienting the laser beam spot and/or direction. Alternatively the moving mirror systems 550, 650, 850 that are operatively coupled to the control system 90 may be utilized for multiplexing or reorienting the laser beam direction. The shared laser source frequency, power output, spot size, modulation, etc. may be selectively varied for its particular application as a welding beam or dimensional scanning beam. If the cladding system sequentially performs the pre-weld dimensional scanning, welding and optional post-weld dimensional scanning a common laser source may be utilized for all three sequential functions. In a real time dynamically operational scanning system any shared laser source has to be multiplexed among the sharing devices.

Figure 12:
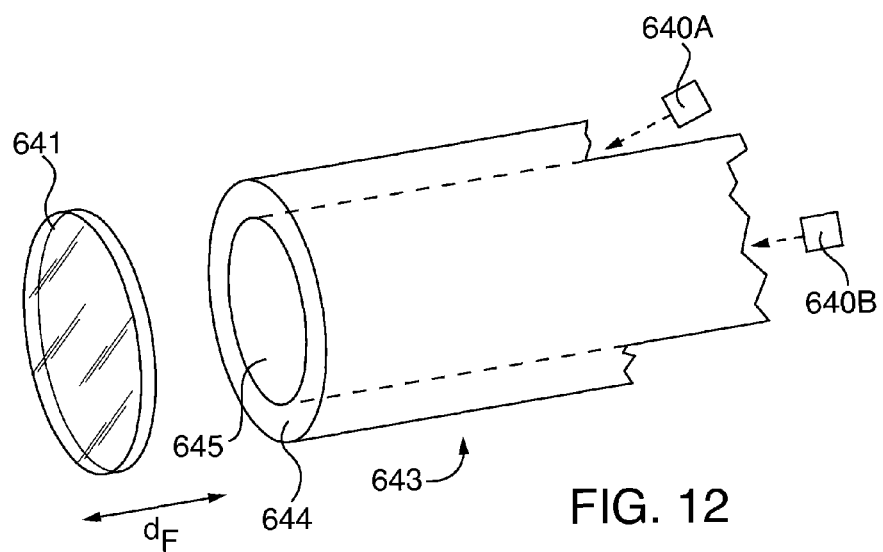
FIG. 12 is a schematic view of a laser welding system nested fiber optic tube and variable focus lens having different laser sources optically coupled to the fiber optic tube core and outer clad optical layers, for selectively varying which laser beam is utilized during the welding process.

In some cladding applications it may be preferable to utilize different welding laser beam properties for different portions of the cladding operation. For example, a first set of laser power intensity and/or frequency range properties might be optimized for the initial cladding layer deposit on the bare substrate, whereas a second set of properties may be optimized for subsequent deposit layers over the initial layer. A third set of properties may be optimal for different surface topologies—for example along an edge boundary of an adjacent weld bead. Rather than dynamically reconfigure the welding laser output properties it may be more suitable to switch different lasers each configured for a specific set of output properties. As shown in FIG. 12, a laser variable focus lens 641 is inserted in front of the output end of nested fiber optic tube 643. Different laser sources 640A and 640B are optically coupled to the fiber optic tube core 645 and outer clad optical layer 644, for selectively varying which laser beam is utilized during the welding process. The laser beam from source 640B that is propagated through the optical core 645 is utilized for one type of welding application. Similarly, the laser beam from source 640A is propagated through the outer clad optical layer 644 for other welding applications.

Unlike known optical camera dimensional measurement systems, embodiments of the present invention acquire dimensional data in spite of smoky conditions and/or ultraviolet emissions caused during the laser welding process, whether the acquisition occurs in real time or sequentially with the laser welding process. Ability to acquire accurate high resolution, pre-weld 3D dimensional data at a rapid rate despite smoky and/or high reflected UV conditions greatly facilitates ability to scan and weld dynamically in real time, as compared to known sequential laser profilometry and laser cutting systems. The addition of optional post-weld 3D dimensional scanning in real time facilitates implementation of dynamic feedback control systems that dynamically vary the cladding system functional properties (e.g., welding path, welding profile or application and dynamic selective distribution of filler material) so that the cladding system can respond to changes in the substrate properties during a welding cycle.

As more fully described in the aforementioned U.S. patent application Ser. No. 13/611,034 the welding process is preferably controlled dynamically and in real time by transferring optical energy from the welding laser to the filler material and substrate that fuses the filler material to the substrate as a filler layer without causing thermal degradation to the substrate. In embodiments described herein, thermal degradation of the component substrate is avoided by dynamically varying optical energy transfer based on component surface topology, so that uniform energy is transferred to the substrate and filler material. In embodiments of the present invention uniform energy transfer may be attained during the welding process by one or more of: varying relative movement rate of the substrate and welding laser beam; varying laser power output; rastering the welding laser beam and substrate relative to each other; translating and oscillating the substrate and welding laser beam relative to each other along the welding pattern path; modulating the laser output, varying filler material composition, introduction rate or dispersal pattern with the distribution filler system; or monitoring energy transfer with the control system in a closed feedback loop and varying energy transfer rate based on the monitored energy transfer.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A system for cladding a turbine component having a substrate and a surface with a filler layer, comprising:
    a work table apparatus for receipt of a turbine component substrate thereon, having a work table interface;
    a laser profilometer apparatus for scanning a surface of the turbine component substrate and acquiring component dimensional data, having:
        a scanning laser generating a scanning laser beam for reflecting optical energy off the turbine component surface;
        at least one movable scanning mirror intercepting the scanning laser beam, for orienting the scanning laser beam on the substrate surface; and
        a laser profilometer apparatus drive system interface coupled to the scanning laser and the at least one movable scanning mirror, for causing relative movement there between;
    a cladding filler material distribution apparatus for introducing filler material on the component substrate;
    a laser welding apparatus for transferring optical energy to the turbine component substrate and filler material on the substrate that fuses the filler material to the substrate as a built up filler layer that is applied as a welding pattern, having:
        a welding laser generating a welding laser beam for transferring optical energy;
        at least one movable welding mirror intercepting the welding laser beam, for orienting the laser beam on the substrate; and
        a welding laser apparatus drive system interface coupled to the welding laser and the at least one movable welding mirror for causing relative movement there between;
    a drive system operatively coupled to the work table, the profilometer, the cladding filler material distribution apparatus, the laser welding apparatus and their respective drive interfaces, for operating the apparatuses and providing controlled relative motion there between; and
    a control system operatively coupled to each of said apparatuses and their drive interfaces, for:
        acquiring component dimensional data with the laser profilometer apparatus;
        comparing the acquired component dimensional data with component specification dimensional data;
        based on the comparing of component and specification dimensional data: determining respective filler introduction and/or welding patterns for cladding component substrate surface portions to conform welded component dimensions to the specification dimensional data; and
        causing the filler apparatus and the laser welding apparatus execute their respective patterns in order to clad the component substrate.

2. The system of claim 1, the control system monitoring and performing all functions in real time.

3. The system of claim 1, the cladding filler material distribution apparatus oriented to introduce filler material on the substrate in advance of the welding laser beam, comprising:
    a distribution apparatus housing having an external surface defining a distribution aperture and an internal chamber in communication with the distribution aperture adapted for retention of filler material therein;
    a feed mechanism adapted for selectively feeding filler material from the internal chamber through the distribution aperture; and
    a feed mechanism drive system interface coupled to the feed mechanism, for selectively feeding filler material from the internal chamber through the distribution aperture.

4. The system of claim 3, the cladding filler material distribution apparatus further comprising:
    a plurality of distribution apertures oriented in an array;
    a distribution aperture isolation mechanism for selectively isolating a distribution aperture from filler material in the internal chamber, coupled to the feed mechanism drive system interface;
    an aperture adjustment mechanism for selectively varying distribution aperture dimensions, coupled to the feed mechanism drive system interface;
    the control system causing the filler apparatus to vary selectively operation of the distribution aperture isolation and adjustment mechanisms and the feed mechanism drive system interface to execute a filler introduction pattern.

5. The system of claim 3, the cladding filler material distribution apparatus further comprising:
    a plurality of internal chambers for retention of respective filler materials therein; and
    an internal chamber selection mechanism for selectively establishing communication between a distribution aperture and a respective internal chamber, coupled to the feed mechanism drive system interface;
    the control system causing the filler apparatus to vary selectively operation of the internal chamber selection mechanism and the feed mechanism drive system interface to vary filler material composition in the filler introduction pattern.

6. The system of claim 1, the control system causing the welding laser and welding laser drive system interface to maintain uniform energy transfer to the substrate throughout the welding pattern without causing thermal degradation to the substrate by any one the following control functions:

varying relative movement rate of the substrate and welding laser beam;

varying welding laser power output;

rastering the welding laser beam and substrate relative to each other;

translating and oscillating the substrate and welding laser beam relative to each other along the welding pattern path;

modulating welding laser power output;

varying filler material composition, introduction rate or dispersal pattern; or monitoring energy transfer with the control system in a closed feedback loop and varying energy transfer rate based on the monitored energy transfer.

7. The system of claim 1, further comprising:

a second laser profilometer apparatus oriented downstream of the laser welding apparatus for scanning the surface of the clad turbine component substrate and acquiring post-weld component dimensional data;

the control system comparing the post-weld component dimensional data with component specification dimensional data, and based on said comparison altering respective filler introduction and/or welding patterns for cladding component substrate surface portions to conform welded component dimensions to the specification dimensional data.

8. The system of claim 1 further comprising:

a filter coupled to the laser profilometer for blocking a range of frequencies generated by the laser welding apparatus or reflected from the component during component cladding; and the profilometer laser beam frequency range is outside the filtered frequency range.

9. The system of claim 1, further comprising:

a fiber optic tube having a pair of separate optical paths that are optically coupled to the respective profilometer and welding lasers on an input end thereof; and a variable focus lens for focusing laser beams generated by the respective lasers optically coupled to an output end of the fiber optic tube.

10. The system of claim 1, the profilometer and the welding apparatus sharing a common laser for generating the respective scanning and welding laser beams and the control system operating the laser source in different modes for the profilometer and welding apparatus by varying one or more of laser power output, frequency or output modulation.

11. A system for cladding a turbine component having a substrate and a surface with a filler layer, comprising:

a work table apparatus for receipt of a turbine component substrate thereon, having a work table interface;

a laser profilometer apparatus for scanning a surface of the turbine component substrate in real time and acquiring component dimensional data, having:

a scanning laser generating a scanning laser beam for reflecting optical energy off the turbine component surface;

at least one movable scanning mirror intercepting the scanning laser beam, for orienting the scanning laser beam on the substrate surface; and a laser profilometer apparatus drive system interface coupled to the scanning laser and the at least one movable scanning mirror, for causing relative movement there between;

a cladding filler material distribution apparatus for introducing filler material on the component substrate, having:

a distribution apparatus housing having an external surface defining a distribution aperture and an internal chamber in communication with the distribution aperture adapted for retention of filler material therein;

a feed mechanism adapted for selectively feeding filler material from the internal chamber through the distribution aperture; and a feed mechanism drive system interface coupled to the feed mechanism, for selectively feeding filler material from the internal chamber through the distribution aperture;

a laser welding apparatus for transferring optical energy to the turbine component substrate and filler material on the substrate that fuses the filler material to the substrate as a built up filler layer that is applied as a welding pattern, having:

a welding laser generating a welding laser beam for transferring optical energy;

at least one movable welding mirror intercepting the welding laser beam, for orienting the laser beam on the substrate; and a welding laser apparatus drive system interface coupled to the welding laser and the at least one movable welding mirror for causing relative movement there between;

a drive system operatively coupled to the work table, the profilometer, the cladding filler material distribution apparatus, the laser welding apparatus and their respective drive interfaces, for operating the apparatuses and providing controlled relative motion there between; and a control system operatively coupled to each of said apparatuses and their drive interfaces, for:

acquiring component dimensional data with the laser profilometer apparatus in real time;

comparing the acquired component dimensional data with component specification dimensional data in real time;

based on the comparing of component and specification dimensional data: determining respective filler introduction and welding patterns for cladding component substrate surface portions to conform welded component dimensions to the specification dimensional data in real time; and causing the filler apparatus and the laser welding apparatus execute their respective patterns in real time in order to clad the component substrate.

12. The system of claim 11, further comprising:

a second laser profilometer apparatus oriented downstream of the laser welding apparatus for scanning the surface of the clad turbine component substrate and acquiring post-weld component dimensional data;

the control system comparing the post-weld component dimensional data with component specification dimensional data, and based on said comparison altering respective filler introduction and/or welding patterns for cladding component substrate surface portions to conform welded component dimensions to the specification dimensional data.

13. The system of claim 11 further comprising:

a filter coupled to the laser profilometer for blocking a range of frequencies generated by the laser welding apparatus or reflected from the component during component cladding; and the profilometer laser beam frequency range is outside the filtered frequency range.

14. The system of claim 11, the control system causing the welding laser and welding laser drive system interface to maintain uniform energy transfer to the substrate throughout the welding pattern without causing thermal degradation to the substrate by any one the following control functions:
- varying relative movement rate of the substrate and welding laser beam;
- varying welding laser power output;
- rastering the welding laser beam and substrate relative to each other;
- translating and oscillating the substrate and welding laser beam relative to each other along the welding pattern path;
- varying filler material composition, introduction rate or dispersal pattern; or
- monitoring energy transfer with the control system in a closed feedback loop and varying energy transfer rate based on the monitored energy transfer.

15. The system of claim 11, the cladding filler material distribution apparatus further comprising:
- a plurality of distribution apertures oriented in an array;
- a distribution aperture isolation mechanism for selectively isolating a distribution aperture from filler material in the internal chamber, coupled to the feed mechanism drive system interface;
- an aperture adjustment mechanism for selectively varying distribution aperture dimensions, coupled to the feed mechanism drive system interface;
- the control system causing the filler apparatus to vary selectively operation of the distribution aperture isolation and adjustment mechanisms and the feed mechanism drive system interface to execute a filler introduction pattern.

16. The system of claim 11, the cladding filler material distribution apparatus further comprising:
- a plurality of internal chambers for retention of respective filler materials therein; and
- an internal chamber selection mechanism for selectively establishing communication between a distribution aperture and a respective internal chamber, coupled to the feed mechanism drive system interface;
- the control system causing the filler apparatus to vary selectively operation of the internal chamber selection mechanism and the feed mechanism drive system interface to vary filler material composition in the filler introduction pattern.

17. A system for cladding a turbine component having a substrate and a surface with a filler layer, comprising:
- a movable work table apparatus driven by a motion control system, for receipt of a turbine component substrate thereon, having a work table interface;
- a laser profilometer apparatus for scanning a surface of the turbine component substrate in real time and acquiring component dimensional data, having:
  - a scanning laser generating a scanning laser beam for reflecting optical energy off the turbine component surface;
  - at least one movable scanning mirror intercepting the scanning laser beam, for orienting the scanning laser beam on the substrate surface; and
  - a laser profilometer apparatus drive system interface coupled to the scanning laser and the at least one movable scanning mirror, for causing relative movement there between;
- a cladding filler material distribution apparatus for introducing filler material on the component substrate, having:
  - a distribution apparatus housing having an external surface defining a distribution aperture and an internal chamber in communication with the distribution aperture adapted for retention of filler material therein;
  - a feed mechanism adapted for selectively feeding filler material from the internal chamber through the distribution aperture; and
  - a feed mechanism drive system interface coupled to the feed mechanism, for selectively feeding filler material from the internal chamber through the distribution aperture;
- a laser welding apparatus for transferring optical energy to the turbine component substrate and filler material on the substrate that fuses the filler material to the substrate as a built up filler layer that is applied as a welding pattern, having:
  - a welding laser generating a welding laser beam for transferring optical energy;
  - at least one movable welding mirror intercepting the welding laser beam, for orienting the laser beam on the substrate; and
  - a welding laser apparatus drive system interface coupled to the welding laser and the at least one movable welding mirror for causing relative movement there between;
- a second laser profilometer apparatus oriented downstream of the laser welding apparatus for scanning the surface of the clad turbine component substrate and acquiring post-weld component dimensional data;
- a drive system operatively coupled to the work table, the profilometer, the cladding filler material distribution apparatus, the laser welding apparatus and their respective drive interfaces, for operating the apparatuses and providing controlled relative motion there between; and
- a control system operatively coupled to each of said apparatuses and their drive interfaces, for:
- acquiring component dimensional data with the laser profilometer apparatus in real time;
- comparing the acquired component dimensional data with component specification dimensional data in real time;
- based on the comparing of component and specification dimensional data: determining respective filler introduction and welding patterns for cladding component substrate surface portions to conform welded component dimensions to the specification dimensional data in real time;
- causing the filler apparatus and the laser welding apparatus execute their respective patterns in real time in order to clad the component substrate in real time; and
- comparing the post-weld component dimensional data with component specification dimensional data, and based on said comparison altering respective filler introduction and/or welding patterns for cladding component substrate surface portions to conform welded component dimensions to the specification dimensional data in real time.

18. The system of claim 17 further comprising:
- a filter coupled to each respective laser profilometer for blocking a range of frequencies generated by the laser welding apparatus or reflected from the component during component cladding; and
- each respective profilometer has a laser beam frequency range outside the filtered frequency range.

19. The system of claim 17, the control system causing the welding laser and welding laser drive system interface to maintain uniform energy transfer to the substrate throughout the welding pattern without causing thermal degradation to the substrate by any one the following control functions:

varying relative movement rate of the substrate and welding laser beam;
varying welding laser power output;
rastering the welding laser beam and substrate relative to each other;
translating and oscillating the substrate and welding laser beam relative to each other along the welding pattern path;
modulating the welding laser power output;
varying filler material composition, introduction rate or dispersal pattern; or
monitoring energy transfer with the control system in a closed feedback loop and varying energy transfer rate based on the monitored energy transfer.

20. The system of claim 17, the cladding filler material distribution apparatus further comprising:
a plurality of distribution apertures oriented in an array;
a distribution aperture isolation mechanism for selectively isolating a distribution aperture from filler material in the internal chamber, coupled to the feed mechanism drive system interface;
an aperture adjustment mechanism for selectively varying distribution aperture dimensions, coupled to the feed mechanism drive system interface;
the control system causing the filler apparatus to vary selectively operation of the distribution aperture isolation and adjustment mechanisms and the feed mechanism drive system interface to execute a filler introduction pattern.

\* \* \* \* \*